United States Patent
Fröhlich et al.

[19]

[11] Patent Number: 6,003,904
[45] Date of Patent: Dec. 21, 1999

[54] PLASTIC CLOSURE CAP PRODUCED BY INJECTION MOLDING

[75] Inventors: Winfried Fröhlich, Bad Camberg; Burkhard Dasbach, Eppstein, both of Germany

[73] Assignee: VDO Adolf Schindling AG, Frankfurt, Germany

[21] Appl. No.: 08/866,900

[22] Filed: May 30, 1997

[30] Foreign Application Priority Data

Jun. 5, 1996 [DE] Germany .......................... 196 22 528

[51] Int. Cl.[6] .................................................. F16L 35/00
[52] U.S. Cl. .................................... 285/124.1; 285/124.4; 285/901; 439/191
[58] Field of Search ........................... 285/124.1, 124.2, 285/124.3, 124.4, 124.5, 901, FOR 118; 439/191; 220/582, 86.1, 3.8, 4.02

[56] References Cited

U.S. PATENT DOCUMENTS

| | | | |
|---|---|---|---|
| 2,510,125 | 6/1950 | Meakin | 439/191 X |
| 2,634,311 | 4/1953 | Darling | 439/191 |
| 3,922,472 | 11/1975 | Foley et al. | 428/429 |
| 4,652,064 | 3/1987 | Cetrone | 439/191 X |
| 4,823,434 | 4/1989 | Inagaki et al. | 16/116 |
| 5,077,326 | 12/1991 | Shibata et al. | 523/523 |
| 5,229,563 | 7/1993 | Isogai et al. | 219/735 |
| 5,405,269 | 4/1995 | Stupecky | 431/191 |
| 5,417,459 | 5/1995 | Gray et al. | 285/124.1 X |
| 5,633,223 | 5/1997 | Vasudevan et al. | 510/303 |
| 5,637,006 | 6/1997 | Almeras | 439/191 |

FOREIGN PATENT DOCUMENTS 2710829  9/1977  Germany ...................... 285/FOR 118

*Primary Examiner*—Eric K. Nicholson
*Assistant Examiner*—John R. Cottingham
*Attorney, Agent, or Firm*—Martin A. Farber

[57] ABSTRACT

A plastic closure cap (1) produced by injection molding for a fuel tank of a motor vehicle is provided, within the region of fuel lines which extend through it, with bushings (6, 7) of a temperature-resistant material of low thermal conductivity. Polyphenylene sulfide containing a proportion of mineral and/or of glass fibers or polyacetate reinforced with glass fibers is suitable for instance as material for the bushings (6, 7).

17 Claims, 1 Drawing Sheet

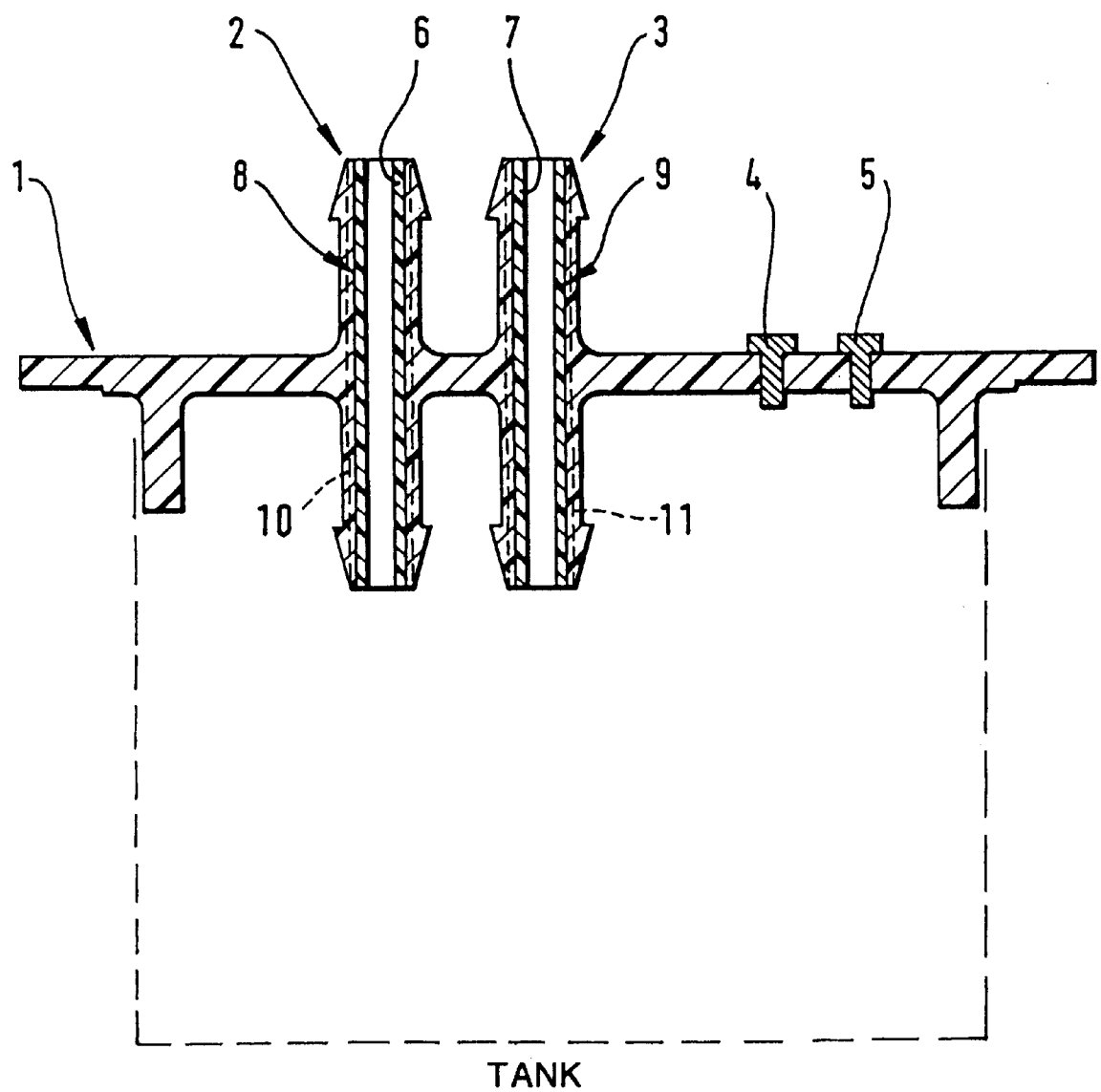

PLASTIC CLOSURE CAP PRODUCED BY INJECTION MOLDING

FIELD AND BACKGROUND OF THE INVENTION

The present invention relates to a plastic closure cap made by injection molding for a fuel tank of a motor vehicle, the cap having at least one fuel line passing through it and contact pins which also pass through it.

Such a closure cap is frequently use in modern motor vehicles when an electric fuel pump is arranged in the fuel tank, and it is therefore known. In that case, the fuel lines which extend out of the fuel tank preferably pass through the closure cap. Electric wires leading to the fuel pump are contacted with the contact pins which are incorporated in the closure cap. Plastic has proven particularly suitable as material for the closure cap since it can be easily worked by injection molding and therefore is of very favorable price in mass production. The contact pins can be simply pressed into such a plastic, or the plastic injected around them.

Furthermore, a closure cap made by plastic injection molding has a high resistance to impact and is of a very good vibrational behavior. Such a closure cap offers a high degree of acoustic dampening and good protection against the fuel flowing out of the fuel container, for instance upon an accident.

A closure cap produced by plastic injection molding has the disadvantage of low material strength at high temperatures. Particularly in modern motor vehicles with diesel engine, temperatures of up to 120° C. and pressures up to 4 bar prevail in the fuel lines, so that the mechanical strength of the closure cap is exceeded in the region of the fuel line. One could consider making the closure cap of a material having a higher resistance to temperature. Such closure caps would then, however, be expensive to manufacture or too brittle to prevent the escape of the fuel from the fuel tank in the event of an accident. Furthermore, no heat-resistant plastic is known into which the contact pins can be worked as easily as in the case of the known plastic for injection molding. In the case of a closure cap consisting of a metallic material there is furthermore the problem of insulating the contact pins.

SUMMARY OF THE INVENTION

It is an object of the invention so to develop a closure cap made by plastic injection molding of the aforementioned type that it has a sufficient mechanical strength even in the case of high temperatures and pressures in the fuel line and is as simple as possible to manufacture.

According to the invention, the closure cap (1) has a bushing (6, 7) of temperature-resistant material of low thermal conductivity in the region of the fuel line (2, 3).

Due to this development, the closure cap can be produced in the same way as the known closure cap by injection molding from plastic which has a high mechanical strength at low temperatures. The bushings in the closure cap in the region of the fuel lines provide assurance that the high temperatures in the fuel line are not transmitted to the other regions of the closure cap. In this way, the closure cap has a high mechanical strength at high temperatures in the region of the fuel line and the required impact strength in its other regions.

Frequently several fuel lines pass through the closure cap. These fuel lines can, for instance, be arranged close together in the closure cap and have a common bushing. However, in accordance with an advantageous further development of the invention the closure cap dampens vibrations particularly well when the closure cap (1) has a separate bushing (6, 7) in the region of each of the fuel lines (2, 3).

The bushings have a high mechanical stability if the bushings (6, 7) consist, in accordance with another advantageous further development of the invention, of a metal tube around which a plastic of low thermal conductivity is injected.

Like the plastic of the closure cap, the bushings have a high resistance to the fuel and are at the same time simple to produce if, in accordance with an advantageous further development of the invention, the bushings (6, 7) are made of polyacetate.

Bushings made of polyacetate have a particularly high strength at high temperatures if the bushings have a filling of glass fiber.

The bushings have a uniformly high strength at high and low temperatures if the percentage of glass fibers in the polyacetate is between 10% and 30%. Furthermore, bushings made of this material are characterized by a particularly high impact strength.

The bushings (6, 7) have high dimensional stability with low temperature conductivity even at particularly high temperatures if, in accordance with another advantageous embodiment of the invention, they consist of polyphenylene sulfide.

The mechanical properties of the bushings at high temperatures can be further improved if the bushings (6, 7) consist of polyphenylene sulfide containing a proportion of mineral and/or of glass fiber.

The bushings (6, 7) can be easily fastened in the closure cap if, in accordance with another advantageous development of the invention, they are injected into the closure cap (1).

Since bushings of polyacetate or polyphenylene sulfide are relatively brittle as compared with the closure cap, there is the danger that they will break off in the event of and accident. In accordance with another advantageous development, this danger can be eliminated in simple manner if the outside of the bushings (6, 7) is completely surrounded by the plastic of the closure cap (1).

The invention permits of numerous embodiments.

BRIEF DESCRIPTION OF THE DRAWING

With the above and other objects and advantages in view, the present invention and its basic principle will become more clearly understood in connection with the detailed description of a preferred embodiment, when considered with the accompanying drawing, of which the sole FIGURE is a sectional view through a closure cap in accordance with the invention.

DETAILED DESCRIPTION OF THE PREFERRED EMBODIMENT

In the drawing, there is shown a closure cap 1 according to the invention having two fuel lines 2, 3 and two contact pins 4, 5 extending through it. The outer region 8, 9 of the bushings 6, 7 is completely surrounded by the plastic of the closure cap 1, so that even in the event of a break in the bushings 6, 7, the tightness of the fuel lines 2, 3 is assured. The contact pins 4, 5 consist of metal and are pushed into the closure cap 1 or injected in it. Electric wires (not shown) can be soldered to the contact pins 4, 5.

The bushings have a high mechanical stability if the bushings (6, 7) consist, in accordance with another advantageous further development of the invention, of a metal tube around which a plastic of low thermal conductivity is injected. The optional thermally insulating layer is indicated by dashed lines at 10 and 11.

We claim:

1. A plastic closure cap, suitable for manufacture by injecting molding, for a fuel tank of a motor vehicle, the closure cap comprising:

a base portion covering said fuel tank;

at least one fuel line extending from said base portion;

contact pins extending through the base portion;

a bushing of temperature-resistant material of low thermal conductivity disposed in a region of the at least one fuel lines; and a thermally insulating layer is provided between said bushing and said base portion such that transfer of heat from said bushing to said base portion is reduced.

2. A closure cap, according to claim 1, wherein said at least one fuel line comprises a first fuel line and a second fuel line, and said bushing comprises a first bushing and a second bushing disposed in regions of the first fuel line and the second fuel line, respectively.

3. A closure cap, according to claim 1, wherein said bushing comprises a metal tube and a layer disposed around the metal tube, the layer being a plastic of low thermal conductivity, said metal tube extending the entire length of said fuel line.

4. A closure cap according to claim 1, wherein said bushing is made of polyacetate.

5. A closure cap according to claim 4, wherein the bushing has a filling of glass fiber in the polyacetate.

6. A closure cap according to claim 5, wherein the percentage of said glass fiber in the polyacetate is between 10% and 30%.

7. A closure cap according to claim 1, wherein said bushing comprises polyphenylene sulfide.

8. A closure cap according to claim 7, wherein said bushing comprises, in addition to the polyphenylene sulfide, a proportion of fiber, the fiber comprising mineral and/or glass fiber.

9. A closure cap according to claim 2, wherein the first and second bushings have a structure attainable by injection into the closure cap.

10. A closure cap according to claim 2, wherein an outside of each of said bushings is completely surrounded by plastic of the closure cap.

11. The plastic closure cap, according to claim 1, wherein said base portion has an unitary construction.

12. The plastic closure cap, according to claim 11, wherein said base portion is made of an injection moldable plastic.

13. The plastic closure cap, according to claim 11, wherein said bushing has higher temperature-resistance than said injection moldable plastic of said base portion, said bushing is capable of transporting high temperature liquid.

14. The plastic closure cap, according to claim 11, wherein said base portion has a substantially planar shape, and said base portion is sufficiently flexible so as to resiliently resist sudden rise in the pressure within the fuel tank in the event of an accident.

15. A plastic closure cap for a fuel tank of a motor vehicle, said closure cap comprising:

a base portion covering said fuel tank, said base portion made of an injection moldable material;

at least one fuel line section extending from said base portion;

a bushing disposed within said fuel line section, wherein said bushing has lower thermal conductivity than said injection moldable plastic of said base portion so as to thermally insulate said base portion from high temperature liquid flowing through said bushing;

wherein said bushing has higher temperature-resistance than said injection moldable plastic of said base portion, said bushing is capable of transporting high temperature liquid; and a thermally insulating layer is provided between said bushing and said base portion such that transfer of heat from said bushing to said base portion is reduced.

16. The plastic closure cap, according to claim 15, wherein said base portion has a substantially planar shape, and said base portion is sufficiently flexible so as to resiliently resist sudden rise in the pressure within the fuel tank in the event of an accident.

17. The plastic closure cap, according to claim 15, further comprising at least one contact pin extending through said base portion.

* * * * *